United States Patent
Hikmet et al.

(10) Patent No.: US 11,378,255 B2
(45) Date of Patent: Jul. 5, 2022

(54) REFLECTOR AND A STARTING SHEET MATERIAL, FOR FORMING A REFLECTOR

(71) Applicant: SIGNIFY HOLDING B.V., Eindhoven (NL)

(72) Inventors: Rifat Ata Mustafa Hikmet, Eindhoven (NL); Ties Van Bommel, Horst (NL); Johannes Petrus Maria Ansems, Hulsel (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/272,469

(22) PCT Filed: Aug. 19, 2019

(86) PCT No.: PCT/EP2019/072135
§ 371 (c)(1),
(2) Date: Mar. 1, 2021

(87) PCT Pub. No.: WO2020/048759
PCT Pub. Date: Mar. 12, 2020

(65) Prior Publication Data
US 2021/0325021 A1    Oct. 21, 2021

(30) Foreign Application Priority Data
Sep. 3, 2018 (EP) .................... 18192161

(51) Int. Cl.
*F21V 7/04* (2006.01)
*F21V 7/18* (2006.01)
(Continued)

(52) U.S. Cl.
CPC ............ *F21V 7/18* (2013.01); *F21V 7/041* (2013.01); *F21V 7/24* (2018.02); *B33Y 80/00* (2014.12)

(58) Field of Classification Search
CPC ... F21V 7/041; F21V 7/06; F21V 7/18; F21V 7/0091
See application file for complete search history.

(56) References Cited

U.S. PATENT DOCUMENTS 3,165,265 A    1/1965  Clause
4,789,921 A   12/1988  Aho
(Continued)

FOREIGN PATENT DOCUMENTS

DE    10200551394 A1    5/2007
EP       2019253 A2    1/2009
(Continued)

*Primary Examiner* — Sean P Gramling
(74) *Attorney, Agent, or Firm* — Daniel J. Piotrowski

(57) ABSTRACT

Starting sheet material (1) adapted for forming a reflector (2) for a lighting device (40), the starting sheet material (1) comprising a flat reflective sheet material (14) shaped as a sector of an annulus bendable into a parabolic reflector or a truncated cone reflector, the flat reflective sheet material (1) comprising a first surface (3), a second surface (4), a first edge (5) shaped as a segment of a circle with a first radius and a second edge (6) shaped as a segment of a circle with a second radius, the second radius being smaller than the first radius, a third edge (7) and a fourth edge (8), the third edge (7) and the fourth edge (8) extending between said first edge (5) and said second edge (6), wherein optical structures (9) are provided on at least a part of one of the first surface (3) and the second surface (4), said optical structures (9) enabling collimation and beam shaping of incident light, said optical structures (9) being applied to the flat reflective sheet material (14) along a direction (11) perpendicular to the radial direction (12) of the flat reflective sheet material (1).

17 Claims, 6 Drawing Sheets

(51) Int. Cl.
   *F21V 7/24*      (2018.01)
   *B33Y 80/00*     (2015.01)

(56) References Cited

U.S. PATENT DOCUMENTS

| | | |
|---|---|---|
| 7,025,476 B2 | 4/2006 | Leadford |
| 8,534,881 B2 | 9/2013 | Howe |
| 2009/0073711 A1 | 3/2009 | Huang |
| 2013/0188362 A1* | 7/2013 | Howe .................... F21V 17/04 362/297 |

FOREIGN PATENT DOCUMENTS

| | | |
|---|---|---|
| JP | S56125705 A | 10/1981 |
| JP | 2005123190 A | 5/2005 |
| JP | 2013516744 A | 5/2013 |
| WO | 2014205027 A1 | 12/2014 |

\* cited by examiner

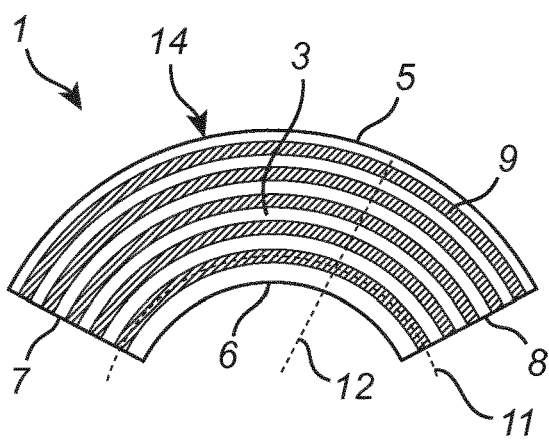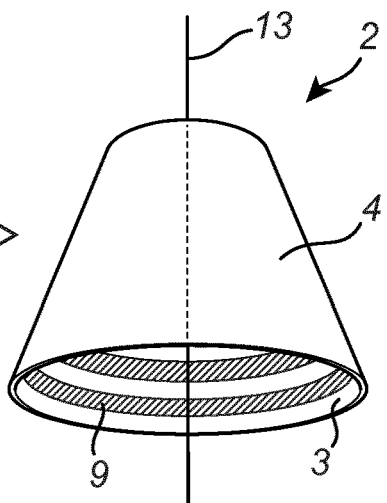
Fig. 1    Fig. 2
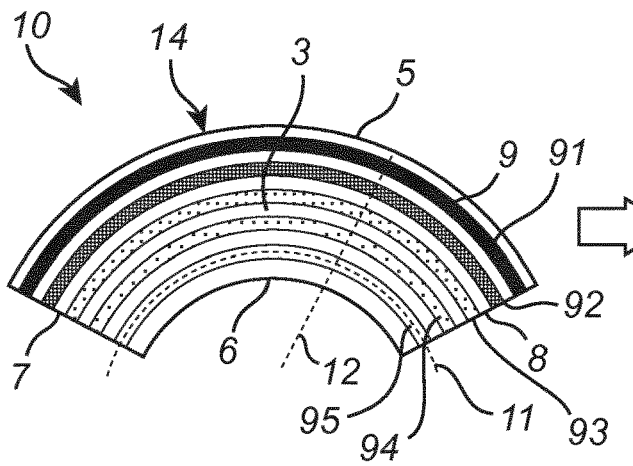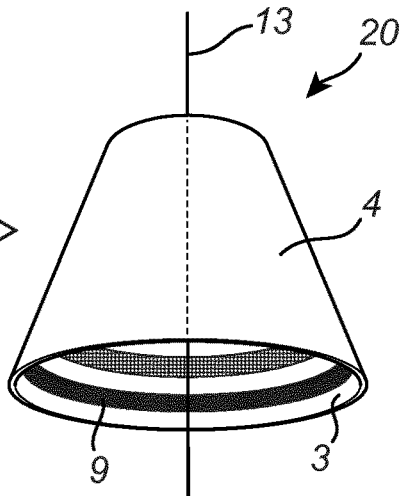
Fig. 3    Fig. 4
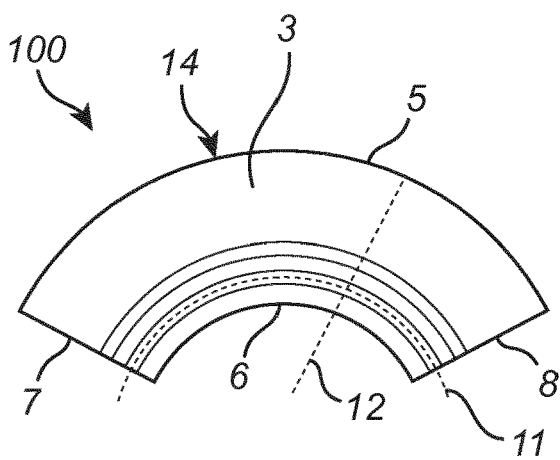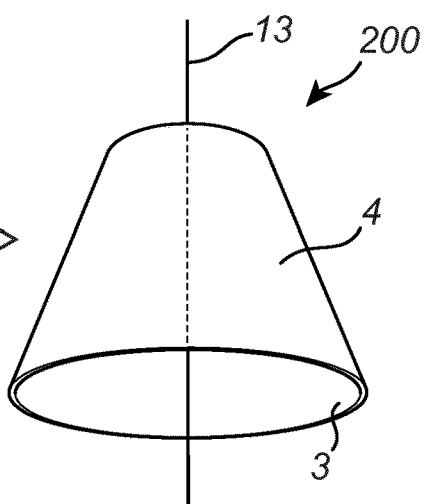
Fig. 5    Fig. 6

REFLECTOR AND A STARTING SHEET MATERIAL, FOR FORMING A REFLECTOR

CROSS-REFERENCE TO PRIOR APPLICATIONS

This application is the U.S. National Phase application under 35 U.S.C. § 371 of International Application No. PCT/EP2019/072135, filed on Aug. 19, 2019, which claims the benefit of European Patent Application No. 18192161.0, filed on Sep. 3, 2018. These applications are hereby incorporated by reference herein.

FIELD OF THE INVENTION

The invention relates to a starting sheet material adapted for forming a reflector for a lighting device, the starting sheet material comprising a flat reflective sheet material shaped as a sector of an annulus bendable into a parabolic reflector or a truncated cone reflector and optical structures. The invention further relates to a reflector formed of such a starting sheet material.

BACKGROUND OF THE INVENTION

Currently, in various downlights specular reflecting surfaces are used for functional and also decorative purposes. Such specular reflecting components used in downlights are produced based on various methods such as deep drawing of sheet metal or segmenting process where flat metal is formed into several lightly shaped sub-segments which are then bent to form a reflector. Vacuum deposition of a metal such as aluminum onto a high gloss injection molded part is also used. However, there is a demand for customization and one needs to offer to the customer more possibilities for specular reflectors having different shapes and dimensions.

Currently a 3D printing process, such as fused deposition modelling, is suggested for producing luminaires. However using a 3D printing process it is not possible to produce specular reflecting surfaces. One can make use of a ready-made reflector based on one of the techniques described above. However, the tools necessary for producing such custom based reflectors are rather costly. One can also use a flat material with a shape of a block arc and bend it into a truncated cone shaped reflector for beam shaping. However, such a truncated reflector does not function as good as a parabolic reflector for obtaining collimation or producing any desired light distributions.

U.S. Pat. No. 8,534,881 B2 discloses an exemplary prior art reflector comprising three material layers, namely a diffusing layer, a lenticular layer or more precisely a prism film and a light reflecting layer. The prisms of the prism film may be arranged in a vertical alignment or in a horizontal alignment. This solution is, however, very complex and provides only little versatility in the design.

SUMMARY OF THE INVENTION

It is an object of the present invention to overcome this problem, and to provide a starting sheet material adapted for forming a reflector for a light emitting device, and thus a reflector, which provides a high degree of versatility in the design while being cheap and simple to manufacture, and which at the same time provides a high degree of collimation of the light output and substantially not affecting the flexibility of the flat reflective sheet material such as to provide a starting sheet material being easy to bend into the shape of the reflector.

It is a further object of the present invention to provide such a starting sheet material which may be produced by a 3D printing process without compromising the optical properties of the optical structures.

According to a first aspect of the invention, this and other objects are achieved by means of a starting sheet material adapted for forming a reflector for a lighting device, the starting sheet material comprising a flat reflective sheet material shaped as a sector of an annulus bendable into a parabolic reflector or a truncated cone reflector, the flat reflective sheet material comprising a first surface, a second surface, a first edge shaped as a segment of a circle with a first radius and a second edge shaped as a segment of a circle with a second radius, the second radius being smaller than the first radius, a third edge and a fourth edge, the third edge and the fourth edge extending between said first edge and said second edge, wherein optical structures are provided on at least a part of at least one of the first surface and the second surface, said optical structures enabling collimation and/or beam shaping of incident light, said optical structures being applied to the flat reflective sheet material along a direction perpendicular to the radial direction of the flat reflective sheet material.

The optical structures may collimate the incident light, that is narrow down the angular distribution of the light, but also other forms of beam shaping may be realized with the optical structures.

The first edge may form the outer contour of the reflector that can be formed from said sheet material. The circular shape of the optical structure is functional relevant and the first edge may deviate from this. This enables making an outer contour for the first edge with different shapes like for instance wave-like, sinusoidal, jagged or other shapes, varying around the average value of the first radius. Within the scope of the present invention this is included in the meaning that the first edge is shaped as a segment of a circle.

Thereby, and in particular by providing the optical structures as structures applied to the flat reflective sheet material along a direction perpendicular to the radial direction of the flat reflective sheet material, a starting sheet material adapted for forming a reflector for a lighting device is provided with which starting sheet material a high degree of versatility in the design of the reflector formed thereof is provided.

Simultaneously, such a starting sheet material and thus also the resulting reflector is cheap and simple to manufacture, and provides a reflector with a high degree of collimation of the light output.

Also, by providing the optical structures as structures applied to the flat reflective sheet material along a direction perpendicular to the radial direction of the flat reflective sheet material, the inherent flexibility of the flat reflective sheet material is not affected thus providing for a starting sheet material being easy to bend into the shape of the reflector.

Furthermore, such a starting sheet material is very easy to produce by a 3D printing process without compromising the optical properties of the optical structures.

The optical structures may be continuous structures or they may be segmented structures. For instance, a continuous structure may be one structure extending along a line or it may consist of several structures arranged along a line, such that the structures are in mutual contact with each other or are placed at a very close distance to each other. In case of the optical structures being segmented structures they are shaped such that they do not collide with each other when folding the starting sheet material to form a reflector. The distance between such segmented structures may for instance be less than 5 mm, less than 3 mm, or even less than 2 mm, the distance being defined as the shortest distance between two neighboring structures.

In an embodiment, the optical structures are applied to the flat reflective sheet material such that a gradient in density of the optical structures in the radial direction of the flat reflective sheet material is provided.

Thereby, a starting sheet material is provided which, in addition to the above advantages, when shaped into a parabolic reflector provides similar optical effects as traditional parabolic reflectors, especially in terms of collimation and provision of desired distributions of the light output.

In an embodiment, the optical structures are provided on a part of the one of the first surface and the second surface of the flat reflective sheet material being closest to said second edge.

Thereby, a starting sheet material is provided which is simpler in structure and cheaper to manufacture.

In an embodiment, the optical structures are provided directly on at least a part of the one of the first surface and the second surface.

Thereby, a starting sheet material with a particularly simple structure is provided.

In an embodiment, the optical structures are provided on the first surface and the second surface.

Thereby, a starting sheet material is provided which, in addition to the above advantages, when shaped into a reflector, may me folded such that any of the first and the second surface are brought to form the inner surface of the final reflector.

In an embodiment, the optical structures are provided on all of the first surface and the second surface.

In an embodiment, the optical structures are provided on all of the one of the first surface and the second surface.

Thereby, a starting sheet material is provided which, in addition to the above advantages, when shaped into a truncated cone shaped reflector provides similar optical effects as traditional truncated cone shaped reflectors.

In an embodiment, the optical structures are optical structures enabling reflection of incident light at the flat reflective sheet material after two refractions on the optical structures.

Thereby, a starting sheet material is provided with which losses due to total internal reflection (TIR) within the optical structures are avoided, thus providing a reflector with an optimal light output in terms of intensity.

In an embodiment, the optical structures are based on flexible polymer material.

Thereby, a starting sheet material is provided with which the optical structures do not at all affect the inherent flexibility of the reflective sheet material, and which is thus particularly simple to bend into a reflector. Also, during bending of the starting sheet material into a reflector the optical behavior of the optical structures is maintained and the optical structures also remain connected to the reflective sheet material.

In an embodiment, the optical structures are applied to the flat reflective sheet material by means of printing or fused deposition modelling.

Thereby, a starting sheet material, and thus a reflector, is provided which is particularly simple and cheap to manufacture.

In an embodiment, the optical structures are refractive optical structures.

Such optical structures are particularly simple and cheap to manufacture.

In an embodiment, the optical structures are diffractive optical structures. One non limiting example of such optical structures are photonic crystals.

Such optical structures may be used to inhibit or entirely avoid wavelength dependent redirection properties otherwise being unwanted.

In an embodiment, the optical structures are provided on the flat reflective sheet material in such a way that the density of the optical structures is any one of more than 40%, more than 60%, and more than 70%.

A density of optical structures of more than 40% has been shown to provide a sufficient degree of collimation of the light output for most uses. Also, as a higher density of optical structures in general provide a higher degree of collimation of the light output, a higher density of optical structures provides an improved degree of collimation.

In an embodiment, the any one or more of the optical structures, the flat reflective sheet material and the whole starting sheet material is obtained by 3D printing. A non-limiting example of a suitable 3D printing process is fused deposition modelling.

Thereby, a starting sheet material, and thus a reflector, is provided which is not only particularly simple and cheap to manufacture but is also particularly versatile in terms of design options as it may be designed according to individual desires, applications and wishes.

The invention further concerns a reflector for a lighting device, the reflector comprising a starting sheet material according to any one of the above claims, wherein said starting sheet material is bent in such a way that the one of the first surface and the second surface of the flat reflective sheet material comprising said optical structures form a surface that faces towards a center axis of the reflector, and the third edge and the fourth edge of the flat reflective sheet material are brought into contact with one another.

The invention still further concerns a lamp, a luminaire, a lighting fixture, a tunable lamp, a tunable luminaire, a tunable lighting fixture, a directional lamp, a directional luminaire or a directional lighting fixture comprising a reflector or a starting sheet material according to the invention.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

FIG. 1 shows a top view of a first embodiment of a starting sheet material according to the invention adapted for forming a reflector for a lighting device.

FIG. 2 shows a schematic perspective view of a reflector formed of the starting sheet material of FIG. 1.

FIG. 3 shows a top view of a second embodiment of a starting sheet material according to the invention adapted for forming a reflector for a lighting device.

FIG. 4 shows a schematic perspective view of a reflector formed of the starting sheet material of FIG. 3.

FIG. 5 shows a top view of a third embodiment of a starting sheet material according to the invention adapted for forming a reflector for a lighting device.

FIG. 6 shows a schematic perspective view of a reflector formed of the starting sheet material of FIG. 5.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

Figure 7:
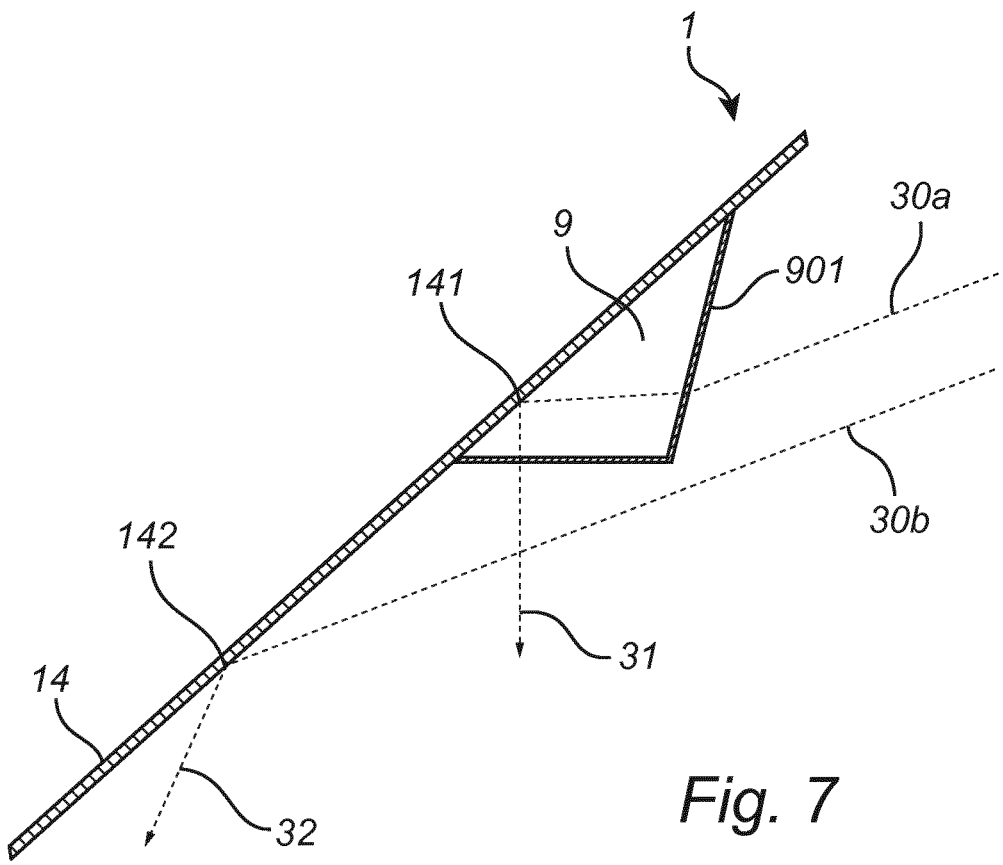
FIG. 7 shows an enlarged view of an embodiment of an optical structure of a starting sheet material according to the invention, the optical structure being a refractive optical structure, illustrating the path of light rays incident on the optical structure.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

FIG. 1 shows a top view of a first embodiment of a starting sheet material 1 according to the invention adapted for forming a reflector 2 (cf. FIG. 2) for a lighting device.

Generally, and irrespective of the embodiment, the starting sheet material 1 comprises a flat reflective sheet material 14 shaped as a sector of an annulus and optical structures 9. The flat reflective sheet material 14 is bendable into a parabolic reflector or a truncated cone reflector.

The flat reflective sheet material 14 comprises a first surface 3 and a second surface 4. The first surface 3 and the second surface 4 are mutually opposite surfaces. The flat reflective sheet material 14 further comprises a first edge 5 shaped as a segment of a circle with a first radius and a second edge 6 shaped as a segment of a circle with a second radius. The second radius is smaller than the first radius. The flat reflective sheet material 14 further comprises a third edge 7 and a fourth edge 8. The third edge 7 and the fourth edge 8 both extend between the first edge 5 and the second edge 6 in a radial direction 12 of the flat reflective sheet material 14.

The flat reflective sheet material 14 may be made of any feasible material being highly reflective. For instance, the flat reflective sheet material 14 may be a thin, bendable sheet of aluminum or silver. Alternatively, the flat reflective sheet material 14 may be a flexible material provided with a foil or film of a highly reflective material such as, but not limited to, aluminum or silver.

The starting sheet material 1 further comprises optical structures 9. The optical structures 9 are in the embodiment shown in FIG. 1 provided on all of the first surface 3 with an even distribution or density of optical structures over the first surface 3. In other embodiments, the optical structures 9 may instead be provided on the second surface 4.

The optical structures 9 are constructed and adapted for providing collimation and beam shaping of incident light. The optical structures 9 are provided as continuous structures applied directly to the flat reflective sheet material 14 along a direction 11 perpendicular to the radial direction 12 of the flat reflective sheet material 14. The optical structures 9 are continuous structures. The optical structures 9 extend continuously from the third edge 7 to the fourth edge 8. The optical structures 9 extend in parallel with the first edge 5 and the second edge 6. Feasible specific types of optical structures will be described further below with reference to FIGS. 7-9.

FIG. 2 shows a schematic perspective view of a reflector 2 formed of the starting sheet material 1 shown in FIG. 1.

As may be seen, and applying for all of the embodiments illustrated in the figures, the reflector 2 is formed by bending the starting sheet material 1 in such a way that the reflector comprises a central axis 13, and that the first surface 3 with the optical structures 9 face towards the central axis 13 and thus towards the interior of the reflector 2. The second surface 4 faces outwards and away from the central axis 13.

In other embodiments, where the optical structures 9 are instead provided on the second surface 4, the reflector is formed by bending the starting sheet material 1 in such a way that the reflector comprises a central axis 13, and that the second surface 4 with the optical structures face towards the central axis 13 and thus towards the interior of the reflector. The first surface 3 then faces outwards and away from the central axis 13.

Irrespective of the embodiment, the reflector 2 is formed by furthermore bending the starting sheet material 1 in such a way that the third edge 7 and the fourth edge 8 of the flat reflective sheet material 14 are brought into contact with one another. The third edge 7 and the fourth edge 8 of the flat reflective sheet material 14 may furthermore be connected with one another. The connection may for instance be made by providing the third and fourth edges 7 and 8 with elements for obtaining a friction locking or snap locking connection, or by simply welding or gluing together the third and fourth edges 7 and 8.

Thereby, a reflector 2 shaped as a truncated cone is provided. In case a parabolic reflector is desired, this may be obtained by furthermore bending the starting sheet material 1 in the radial direction 12, or by providing the starting sheet material 14 with suitably curved third and fourth edges 3 and 4. The reflector may further be a specular reflector.

FIG. 3 shows a top view of a second embodiment of a starting sheet material 10 according to the invention adapted for forming a reflector 20 (cf. FIG. 4) for a lighting device. The starting sheet material 10 differs from that shown in FIG. 1 and described above only in virtue of the following.

The optical structures 9 are provided in bands 91, 92, 93, 94, 95 applied directly to the flat reflective sheet material 14 along the direction 11 perpendicular to the radial direction 12 of the flat reflective sheet material 14. The optical structures 9 of each band 91-95 are continuous structures. Each band 91-95 of optical structures 9 extend continuously from the third edge 3 to the fourth edge 4. Each band 91-95 of optical structures 9 extend in parallel with the first edge 5 and the second edge 6.

The optical structures 9 are furthermore applied to the flat reflective sheet material 14 such that a gradient in density of the optical structures 9 in the radial direction 12 of the flat reflective sheet material 14 is provided. More particularly, the band 91 of optical structures 9 arranged closest to the first edge 5 comprises the highest density of optical structures 9, and the density of optical structures 9 in each band 92-95 decrease gradually such that the band 95 closest to the second edge 6 comprises the lowest density of optical structures 9. On FIG. 3 this is illustrated by a darker tone illustrating a higher density of optical structures.

In an alternative, it is also feasible to provide the band 91 of optical structures 9 arranged closest to the first edge 5 with the lowest density of optical structures 9, and the density of optical structures 9 in each band 92-95 increasing gradually such that the band 95 closest to the second edge 6 comprises the highest density of optical structures 9.

FIG. 4 shows a schematic perspective view of a reflector 20 formed of the starting sheet material 10 shown in FIG. 3. The reflector 20 is formed by bending the starting sheet material 10 as described above.

FIG. 5 shows a top view of a third embodiment of a starting sheet material 100 according to the invention adapted for forming a reflector 200 (cf. FIG. 6) for a lighting device. The starting sheet material 100 differs from that shown in FIG. 1 and described above only in virtue of the following.

The optical structures 9 are provided only on a part of the first surface 3. More particularly, the optical structures 9 are provided on a part of the first surface 3 of the flat reflective sheet material 14 being closest to the second edge 6 with the second, smaller, radius.

FIG. 6 shows a schematic perspective view of a reflector 200 formed of the starting sheet material 100 shown in FIG. 5. The reflector 200 is formed by bending the starting sheet material 100 as described above. As the optical structures 9 are in this case provided near the top of the reflector 200, they are not visible on FIG. 6.

Figure 8:
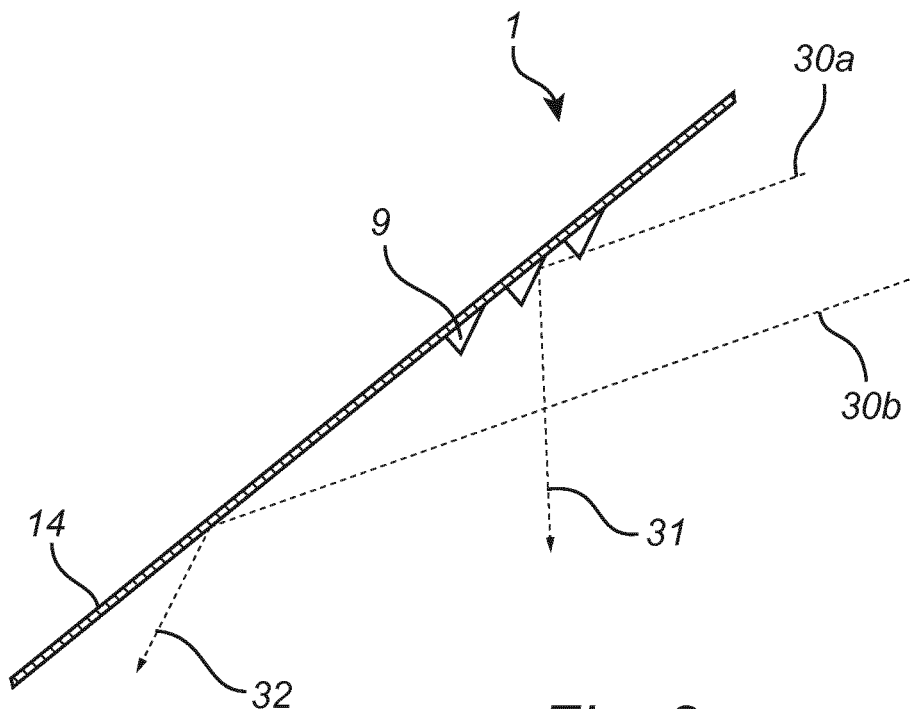
FIG. 8 shows an enlarged view of an embodiment of an optical structure of a starting sheet material according to the invention, the optical structure being a diffractive optical structure, illustrating the path of light rays incident on the optical structure.
Figure 9:
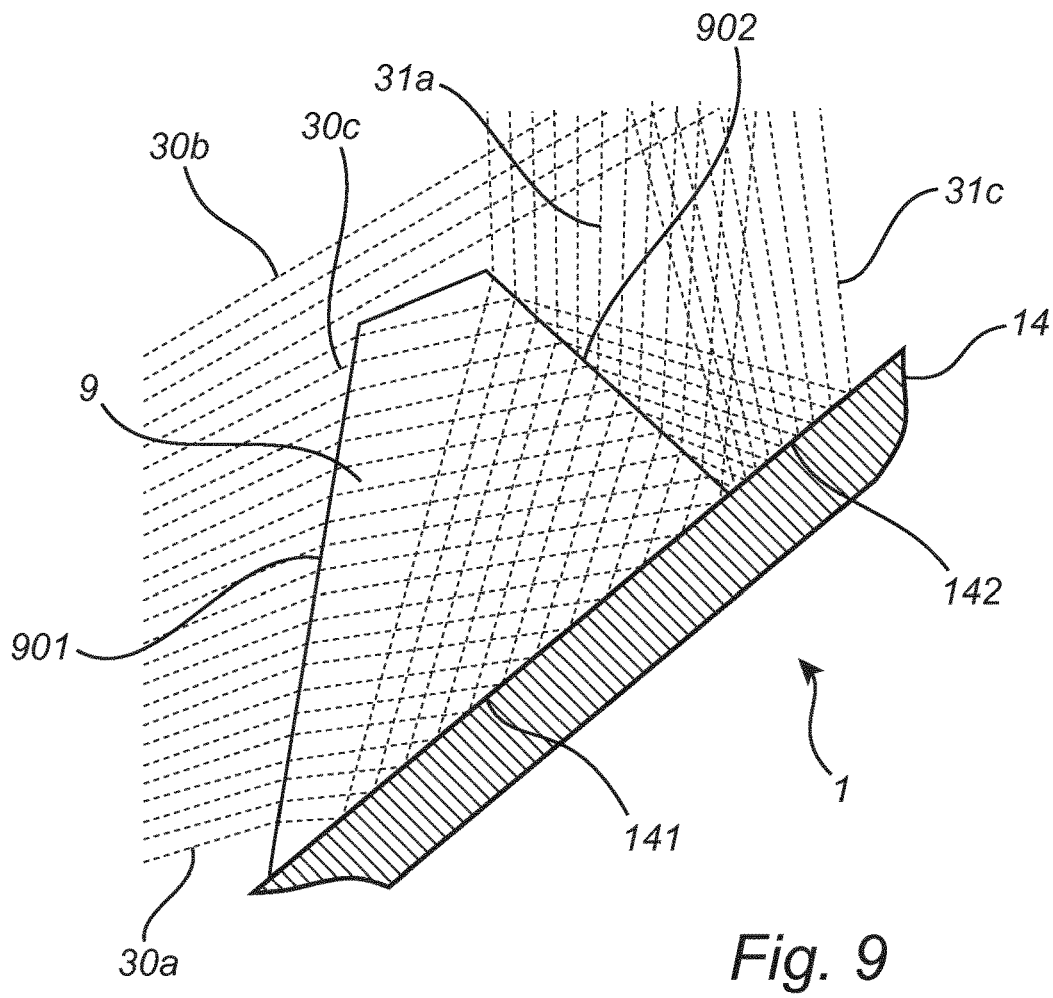
FIG. 9 shows an enlarged view of an embodiment of an optical structure of a starting sheet material according to the invention, the optical structure being an optical structure enabling reflection of incident light at the flat reflective sheet material after two refractions on the optical structure, illustrating the path of light rays incident on the optical structure.

Turning now to FIGS. 7, 8 and 9 various embodiments and types of the optical structures 9 will be described. Generally, the optical structures 9 are transparent optical structures.

The optical structures 9 may be diffractive optical structures or refractive optical structures. The optical structures 9 may be made of a flexible material such as but not limited to silicone.

FIG. 7 shows an embodiment in which the optical structures 9 are refractive optical structures. For the sake of simplicity only one optical structure 9 is shown. As illustrated on FIG. 7, the incident light ray 30a is refracted when incident on the optical structure 9 at the surface 901, and is subsequently reflected at the reflective sheet material 14 at a position 141 within the optical structure 9, resulting in a refracted and reflected output light ray 31. In comparison the incident light ray 30b does not hit the optical structure 9, and is merely reflected at the reflective sheet material 14 at a position 142 outside of the optical structure 9, thus resulting in a reflected output light ray 32.

FIG. 8 shows an embodiment in which the optical structures 9 are diffractive optical structures. For the sake of simplicity only one optical structure 9 is shown. As illustrated on FIG. 7, the incident light ray 30a is reflected directly when incident on the optical structure 9 due to diffraction, resulting in a diffracted and reflected output light ray 31. In comparison the incident light ray 30b does not hit the optical structure 9, and is merely reflected at the reflective sheet material 14, thus resulting in a reflected output light ray 32. A non-limiting example of such diffractive optical structures 9 are photonic crystals.

In some embodiments, there may be a gradient in the size of the diffractive optical structures 9 along the radial direction 12 of the flat reflective sheet material 14. The gradient may be in the form of a staged increase or a gradual increase along the radial direction 12 of the flat reflective sheet material 14.

FIG. 9 shows an embodiment in which the optical structures 9 are optical structures enabling reflection of incident light at the flat reflective sheet material 14 after two refractions on the optical structures 9. For the sake of simplicity only one optical structure 9 is shown. As illustrated on FIG. 9, some incident light rays, such as the light ray 30a, is refracted a first time when incident on the surface 901 of the optical structure 9, is subsequently reflected at the reflective sheet material 14 at a position 141 within the optical structure 9, and is finally refracted for a second time at the surface 902 of the optical structure 9 where the light ray leaves the optical structure 9. Some other incident light rays, such as the light ray 30c, is refracted a first time when incident on the surface 901 of the optical structure 9, is subsequently refracted for a second time at the surface 902 of the optical structure 9 where the ray leaves the optical structure 9 and is finally reflected at the reflective sheet material 14 at a position 142 outside the optical structure 9. The portion of the light that is refracted twice and then reflected at the reflective sheet is preferably 10%, more preferably 20% and most preferably 35%. In both cases the result is a twice refracted and subsequently reflected output light ray 31a. In comparison the incident light ray 30b does not hit the optical structure 9, and will merely be reflected at the reflective sheet material 14 at a position not shown on FIG. 9, thus resulting in a reflected output light ray.

Figure 11:
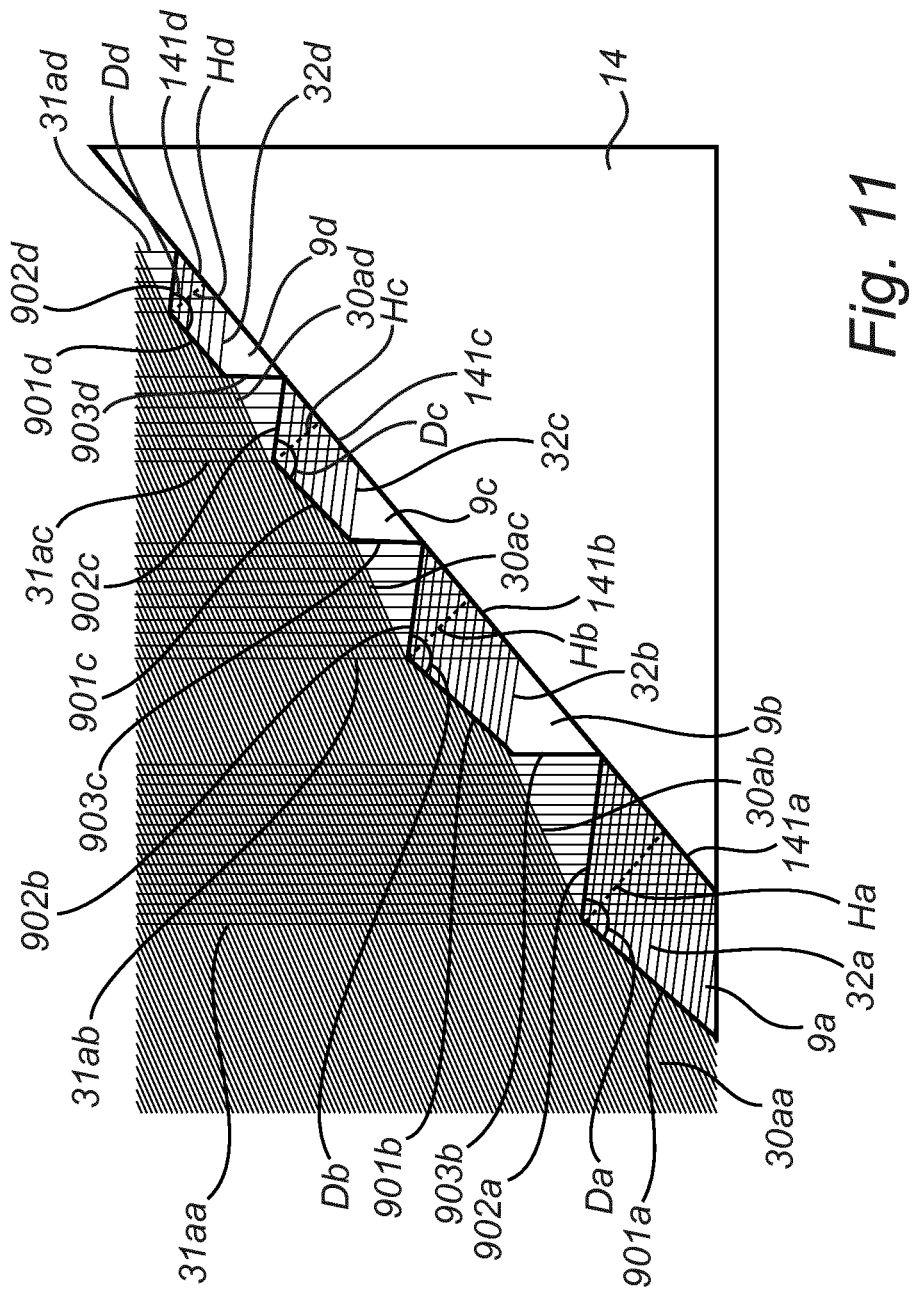
FIG. 11 shows an enlarged view of an alternative embodiment of an optical structure of a starting sheet material according to the invention, the optical structure being a refractive optical structure, illustrating the path of light rays incident on the optical structure.
Figure 12:
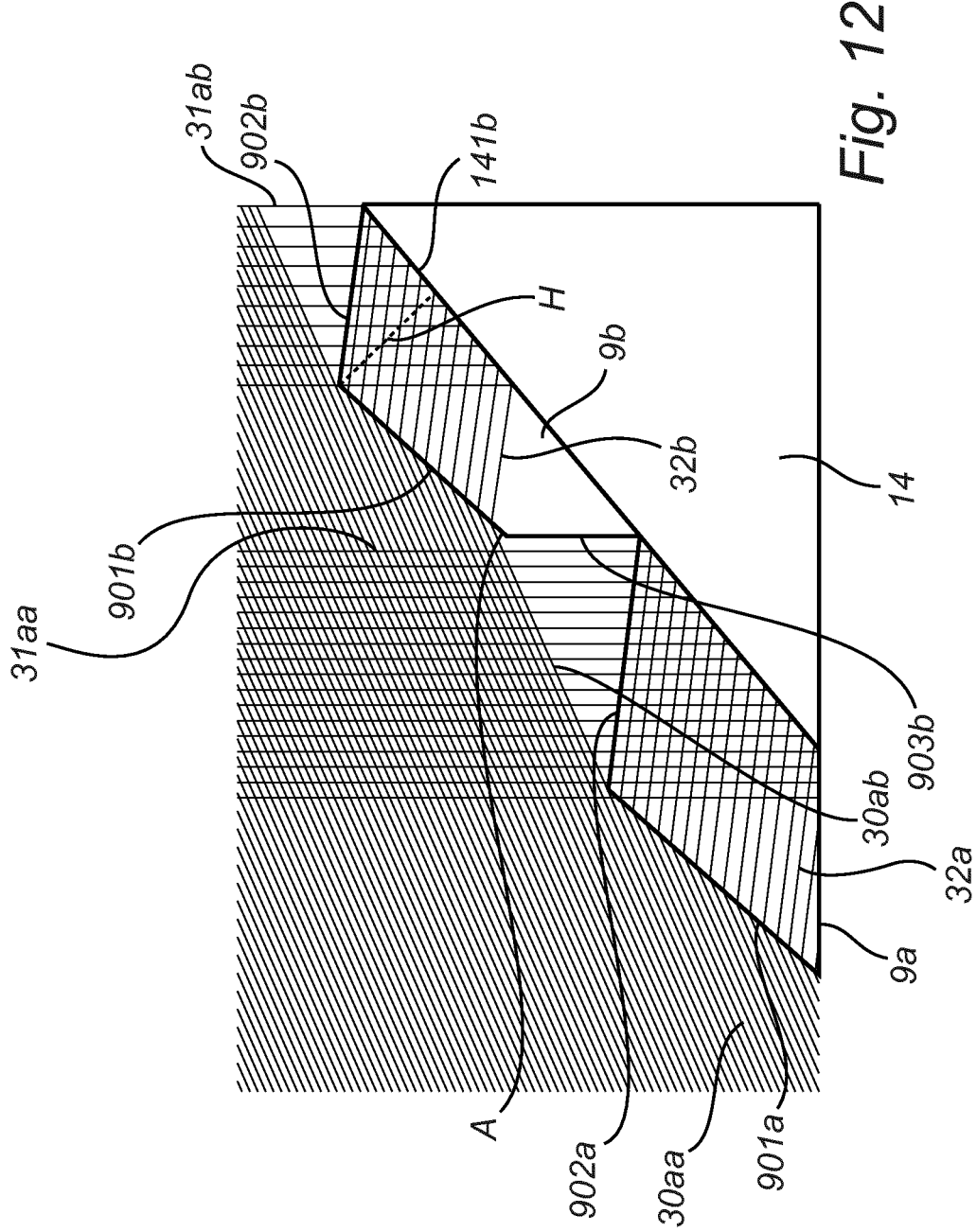
FIG. 12 shows a further enlarged view of the optical structure of FIG. 11.
Figure 13:
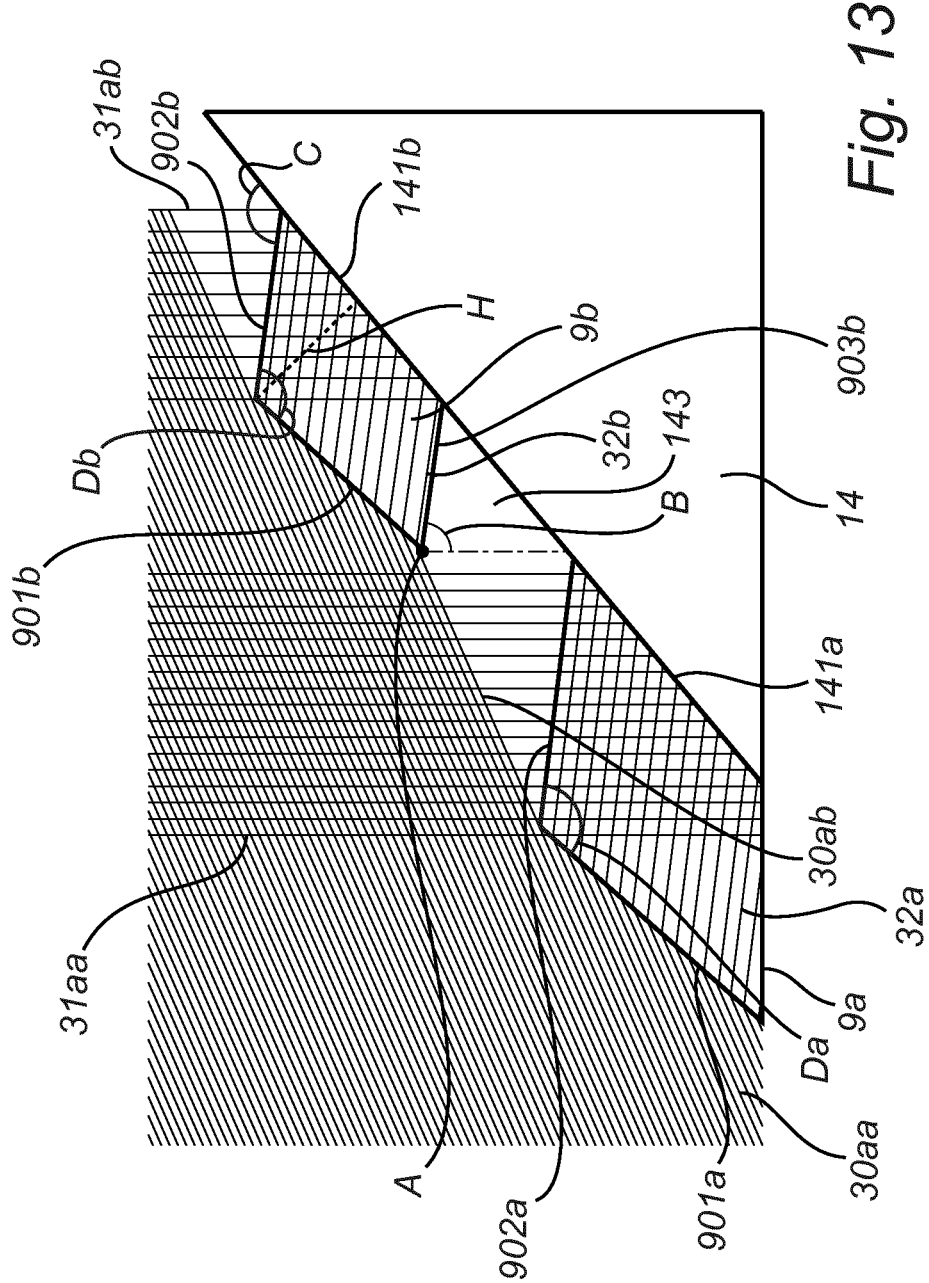
FIG. 13 shows an enlarged view of another alternative embodiment of an optical structure of a starting sheet material according to the invention, the optical structure being a refractive optical structure, illustrating the path of light rays incident on the optical structure.

FIGS. 11 and 12 show one alternative embodiment, and FIG. 13 another alternative embodiment, in which the optical structures 9a-9d are refractive optical structures. Four optical structures 9a, 9b, 9c and 9d are shown on FIG. 11, while FIG. 12 is an enlargement showing only the optical structures 9a and 9b. FIG. 13 shows optical structures 9a and 9b of a different geometrical construction.

As illustrated on FIGS. 11, 12 and 13, a first group of incident light rays 30aa are refracted when incident on the optical structure 9a at the surface 901a, and are subsequently reflected at the reflective sheet material 14 at a position 141a within the optical structure 9a, resulting in refracted and reflected output light rays 31aa. A second group of incident light rays 30ab are refracted when incident on the optical structure 9b at the surface 901b, and are subsequently reflected at the reflective sheet material 14 at a position 141b within the optical structure 9b, resulting in refracted and reflected output light rays 31ab. A third group of incident light rays 3ac are refracted when incident on the optical structure 9c at the surface 901c, and are subsequently reflected at the reflective sheet material 14 at a position 141c within the optical structure 9c, resulting in refracted and reflected output light rays 31ac. Finally, a fourth group of incident light rays 30ad are refracted when incident on the optical structure 9d at the surface 901d, and are subsequently reflected at the reflective sheet material 14 at a position 141d within the optical structure 9d, resulting in refracted and reflected output light rays 31ad.

As may be seen in FIGS. 11, 12 and 13, the mutual positions and configurations of the optical structures 9a-9d are chosen such that e.g. the light ray of the second group of light rays 30ab passing just above the optical structure 9a is refracted by the second optical structure 9b, or in other words such that all incident light rays are refracted by an optical structure.

Generally, each optical structure 9a-9c has the same geometrical configuration and comprises a first side or surface 901a-901d, respectively, for coupling in incident light source light and refracting in-coupled light source light towards the flat reflective sheet material 14, a second side or surface 902a-902d, respectively, through which the refracted and reflected light source light exits the optical structure and which further aims the light to obtain collimated light, and a third side or surface 903a-903d, respectively, arranged and configured to avoid blocking of light from the previous adjacent optical structure seen in the direction of propagation of the incident light. In other words, and referring to FIG. 12 specifically, the position of the corner point A of each optical structure where the first side or surface and the second side or surface meet is chosen such that the light ray just missing the previous optical structure, e.g. the light ray 30ab just missing the optical structure 9a, is refracted by the following optical structure, e.g. the optical structure 9b, and such that the light ray leaving the second side of the previous adjacent optical structure, e.g. the light ray 3l as leaving the second side 902a of the previous adjacent optical structure 9a, is not refracted by the following optical structure, e.g. the optical structure 9b. Thereby it is ensured that all incident light is refracted, reflected and collimated by propagation through one optical structure and that no light is lost.

The respective first surfaces 901a-901d extend in an angle Da-Dd, respectively, to the respective second surface 902a-902d (cf. FIGS. 11 and 13). The first surfaces 901a-901d may comprise a gradient in the angle D from the first surface of one optical structure, e.g. surface 901a of optical structure 9a, to the first surface of an adjacent optical structure, e.g. surface 901b of optical structure 9b. The gradient in angle from the first surface of one optical structure to the first surface of the adjacent optical structure may decrease along the radial direction 12 of the flat reflective sheet material 14, Referring to FIG. 13 specifically, the gradient in the angle D may be such that the angles Da-Dd, respectively, of the optical structures 9a-9d, respectively, are chosen such that Da>Db>Dc>Dd.

The second surfaces 902a-902d each extend in an angle C (cf. FIG. 13) to the surface of the flat reflective sheet 14. The angle C is chosen to be equal to or larger than a value of the angle C corresponding to that the respective second surface 902a-902d extends in a direction being parallel to the refracted light 32a-32d, respectively, propagating within the optical structure 9a-9d, respectively, to aim the collimated light further.

The third surfaces 903a-903d each extend in an angle B (cf. FIG. 13) chosen to be within such an interval of values of the angle B that the respective third surface 903a-903d extends in a direction being parallel to the reflected light rays 31aa-31ad, respectively, from the previous adjacent optical structure, in a direction being parallel to the refracted light 32a-32d, respectively, propagating within the optical structure 9a-9d, respectively, or in any direction between these two directions.

The height H of the optical structures may comprise a gradient, which gradient may decrease along the radial direction 12 of the flat reflective sheet material 14. Referring to FIG. 11 specifically, the gradient in height H may be such that the heights Ha-Hd, respectively, of the optical structures 9a-9d, respectively, are chosen such that Ha>Hb>Hc>Hd.

In some embodiments, a gap 143 (cf. FIG. 13) may be provided between adjacent optical structures, e.g. optical structures 9a and 9b. There may be a gradient in the size of the gap. The size of the gap may be dependent on the angle B of the third side of the adjacent optical structure. For instance, the size of the gap 143 shown on FIG. 13 is dependent on the angle B of the third side 903b of the optical structure 9b. In alternative embodiments, there may be an overlap 144 (cf. FIG. 12) between adjacent optical structures. There may be a gradient in the size of the overlap along the radial direction 12 of the flat reflective sheet material 14. In still other embodiments there may be neither a gap nor overlap between adjacent optical structures. Combinations of these embodiments are also feasible.

Figure 10:
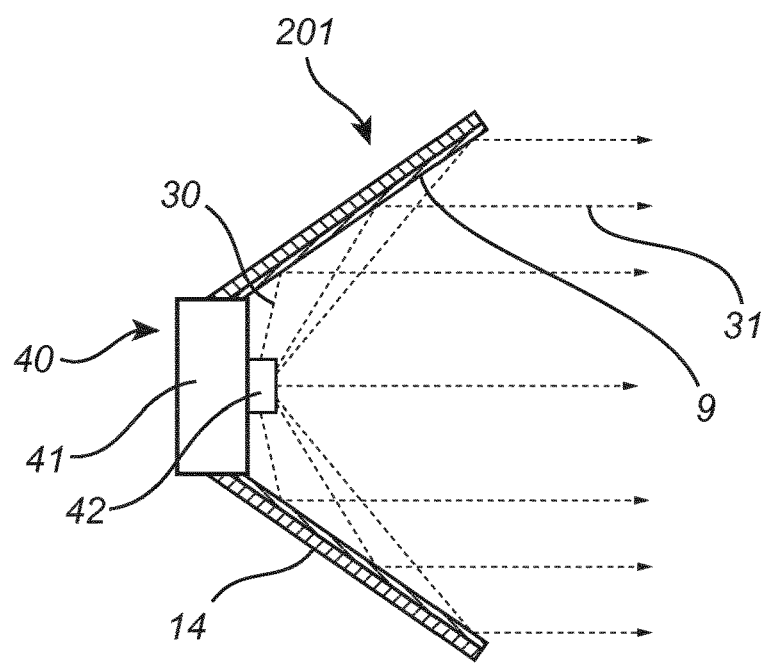
FIG. 10 shows a cross-sectional perspective view of a lighting device comprising a reflector formed of a starting sheet material according to the invention.

Finally, FIG. 10 shows a lighting device 40 comprising a reflector 201 formed of a starting sheet material 14 according to the invention. The lighting device 40 comprises a light source 42 arranged on a basis 41. The light source 42 may be an LED. The basis 41 may include an electrical connection element. The reflector 201 is attached or connected to the basis 41 and collimates and shapes the light 30 emitted by the light source 42 such as to provide a collimated light output 31.

The light source 42 is positioned inside the reflector, and in a particular embodiment centrally inside the reflector. The light source 42 may be a solid state light source, such as for example a light emitting diode (LED) and/or a laser diode. The light source 42 preferably emits white light, in a particular embodiment on the black body line (BBL). The light source 42 and in a particular embodiment emits white light in the color temperature range from 2000 to 8000 K, preferably with at least a color rendering index (CRI) of 70.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. Starting sheet material adapted for forming a reflector for a lighting device, the starting sheet material comprising:
a flat reflective sheet material shaped as a sector of an annulus bendable into a parabolic reflector or a truncated cone reflector, the flat reflective sheet material comprising a first surface, a second surface, a first edge shaped as a segment of a circle with a first radius and a second edge shaped as a segment of a circle with a second radius, the second radius being smaller than the first radius, a third edge and a fourth edge, the third edge and the fourth edge extending between said first edge and said second edge, wherein optical structures are provided on at least a part of at least one of the first surface and the second surface, said optical structures enabling collimation and/or beam shaping of incident light, said optical structures being positioned on the flat reflective sheet material along a direction perpendicular to the radial direction of the flat reflective sheet material, and wherein said positioning of the optical structures establishes gaps between individual optical structures enabling a portion of light emanating from a light source within the reflector and incident to an individual optical structure to be refracted twice by said individual optical structure before being subsequently reflected at the surface of the flat reflective sheet material.

2. Starting sheet material according to claim 1, wherein said optical structures are applied to the flat reflective sheet material such that a gradient in density of the optical structures in the radial direction of the flat reflective sheet material is provided.

3. Starting sheet material according to claim 1, wherein said optical structures are provided on a part of the one of the first surface and the second surface of the flat reflective sheet material being closest to said second edge.

4. Starting sheet material according to claim 1, wherein said optical structures are provided directly on at least a part of the one of the first surface and the second surface.

5. Starting sheet material according to claim 1, wherein said optical structures are positioned on the first surface and the second surface, or on all of the at least one of the first surface and the second surface, or on all of the first surface and the second surface.

6. Starting sheet material according to claim 1, wherein said optical structures are based on flexible polymer material.

7. Starting sheet material according to claim 1, wherein said optical structures are not applied to the flat reflective sheet material by means of employing a prism film.

8. Starting sheet material according to claim 1, wherein said optical structures are any one of:
refractive optical structures,
diffractive optical structures,
segmented optical structures, and
combinations thereof.

9. Starting sheet material according to claim 1, wherein said optical structures are provided on the flat reflective sheet material in such a way that the density of the optical structures is any one of:
more than 40%,
more than 60%, and
more than 70%.

10. Starting sheet material according to claim 1, wherein any one or more of the optical structures, the flat reflective sheet material and the whole starting sheet material is obtained by 3D printing.

11. A reflector for a lighting device, the reflector comprising a starting sheet material according to claim 1, wherein said starting sheet material is bent in such a way that the one of the first surface and the second surface of the flat reflective sheet material comprising said optical structures form a surface facing towards a center axis of the reflector, and the third edge and the fourth edge of the flat reflective sheet material are brought into contact with one another.

12. A reflector according to claim 11, wherein the third edge and the fourth edge of the flat reflective sheet material are connected with one another.

13. A reflector according to claim 11, wherein the reflector is a truncated cone shaped reflector or a parabolic reflector, and/or wherein the reflector is a specular reflector.

14. A lamp, a luminaire, a lighting fixture, a tunable lamp, a tunable luminaire, a tunable lighting fixture, a directional lamp, a directional luminaire or a directional lighting fixture comprising a reflector according to claim 11.

15. Starting sheet material according to claim 1, wherein the portion of light that is refracted twice and then reflected at the reflective sheet is greater than 10% of the light incident to an individual optical structure.

16. Starting sheet material according to claim 1, wherein the portion of light that is refracted twice and then reflected at the reflective sheet is greater than 20% of the light incident to an individual optical structure.

17. Starting sheet material according to claim 1, wherein the portion of light that is refracted twice and then reflected at the reflective sheet is greater than 35% of the light incident to an individual optical structure.

* * * * *